United States Patent [19]
Barbieri et al.

[11] Patent Number: 5,883,197
[45] Date of Patent: *Mar. 16, 1999

[54] COMPOSITIONS BASED ON ELASTOMERIC POLYMERS OF VINYLINDENE FLUORIDE, HEXAFLUOROPROPENE AND OPTIONALLY TETRAFLUOROETHYLENE, SUITABLE FOR PROVIDING MICROCELLULAR FOAMED ARTICLES

[75] Inventors: Franco Barbieri, Tortona; Raffaele Ferro; Giuseppe Fiorillo, both of Milan, all of Italy

[73] Assignee: Ausimont S.p.A., Milan, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 435,841

[22] Filed: May 5, 1995

Related U.S. Application Data

[63] Continuation of Ser. No. 68,962, May 28, 1993, abandoned.

[30] Foreign Application Priority Data

May 29, 1992 [IT] Italy ................................. MI92A1319

[51] Int. Cl.$^6$ ................................. C08C 19/24; C08F 8/40
[52] U.S. Cl. ............................................................. 525/340
[58] Field of Search .............................................. 525/340

[56] References Cited

U.S. PATENT DOCUMENTS

| | | | |
|---|---|---|---|
| 3,868,337 | 2/1975 | Gros | 525/340 |
| 4,259,463 | 3/1981 | Moggi et al. | 525/331 |
| 4,496,682 | 1/1985 | Schmiegel . | |

FOREIGN PATENT DOCUMENTS

| | | |
|---|---|---|
| 0059495 | 9/1982 | European Pat. Off. . |
| 0140207 | 5/1985 | European Pat. Off. . |
| 0169304 | 1/1986 | European Pat. Off. . |
| 0218929 | 4/1987 | European Pat. Off. . |
| 41009 A189 | 10/1989 | Italy . |

*Primary Examiner*—Cecilia J. Tsang
*Assistant Examiner*—Patrick R. Delaney
*Attorney, Agent, or Firm*—Bryan Cave LLP

[57] ABSTRACT

The present invention relates to compositions based on elastomeric polymers of vinylidene fluoride, hexafluoropropene and optionally tetrafluoroethylene suitable for providing microcellular foamed vulcanized articles by extrusion or compression molding. In the case of the production of extruded articles based on vinylidene fluoride and hexafluoropropene copolymers, the compositions comprise: the copolymer, bisphenol AF, a quaternary phosphonium or aminophosphonium salt, azodicarbonamide, MgO, Ca(OH)$_2$, zinc stearate and a plasticizer, each of the components being contained in an exactly defined proportion.

8 Claims, 1 Drawing Sheet

COMPOSITIONS BASED ON ELASTOMERIC POLYMERS OF VINYLINDENE FLUORIDE, HEXAFLUOROPROPENE AND OPTIONALLY TETRAFLUOROETHYLENE, SUITABLE FOR PROVIDING MICROCELLULAR FOAMED ARTICLES

This is a continuation of U.S. application Ser. No. 08/068,962, filed May 28, 1993 now abandoned.

FIELD OF THE INVENTION

The present invention relates to compositions based on elastomeric polymers of vinylidene fluoride, hexafluoropropene and, optionally, tetrafluoroethylene.

The above-identified polymers are being used more and more in fields where high chemical stability and exceptional resistance to temperatures exceeding 220° C. for continuous use are required. Because of these characteristics, these fluoroelastomers are used particularly for producing gaskets, O-rings, and seals of high technological value.

DESCRIPTION OF THE PRIOR ART

Because of the intrinsic characteristics of their chemical structure, the specific density of these fluoroelastomers varies from 1.78 to 2.01. This results, of course, in final articles comprising the compound having high specific densities. The cost of the articles is affected by this property. This, in turn, has retarded the use of these fluoroelastomers in fields is where the excessive weight of the final article has led to an unacceptable difference in cost which favors other rubbers having lesser chemico-physical properties.

The production of non-fluorinated elastomeric articles having a lower final weight through the use of formulations capable of providing microcellular foamed products is a generally known technology, applicable on an industrial scale.

This technology—utilized, for example, for natural and silicone rubbers—comprises the use of blends which, besides the usual curing systems, contain appropriate foaming agents. These foaming agents, as a consequence of their thermal decomposition during the processing step, are capable of generating gases, mainly nitrogen and carbon oxides, which swell the elastomeric material.

The main classes of such swelling agents are:

azodicarbonamide and its derivatives;

variously substituted hydrazides, for example p.toluene sulphonyl hydrazide.

In order to control their thermal decomposition to meet processing requirements, such swelling agents can be associated with appropriate kickers, which modify the thermal decomposition kinetics thereof.

Examples of such kickers are:

organic acids (for example salicylic, glycolic, lactic, citric, succinic acids);

phosphoric acid;

organic bases (for example guanidines and ethanolamines);

inorganic bases (for example borax and potassium carbonate);

zinc, mercury, barium, cadmium, calcium, strontium, magnesium, lead, tin, silicium compounds.

In the case of the above-described vinylidene fluoride elastomeric polymers, the use of this technology has not yet permitted the production of foamed articles having acceptable appearance and physico-mechanical characteristics. In the best of circumstances, spongy materials with large bubbles and large inner cavities and a wrinkly surface appearance have been obtained.

SUMMARY OF THE INVENTION

It has now been found that the use of particular combinations of components usually used for the curing of the above-described fluoroelastomers, and of particular components known as swelling agents—each of these components being used in well-defined proportions—permits the production of microcellular foamed articles endowed with excellent characteristics as regards the dimensional and cell distribution homogeneity, the outer appearance, and their physico-mechanical properties.

Thus, it is an object of the present invention to provide compositions based on elastomeric polymers of vinylidene fluoride, hexafluoropropene and optionally tetrafluoroethylene suitable for providing microcellular foamed vulcanized articles exhibiting the above-described characteristics.

DETAILED DESCRIPTION OF THE INVENTION

The compositions of the present invention vary slightly depending on whether the fluoroelastomer is a copolymer of vinylidene fluoride (78–83 mols %) with hexafluoropropene (17–22 mols %) or a terpolymer of vinylidene fluoride (50–79 mols %), hexafluoropropene (17–25 mols %) and tetrafluoroethylene (4–25 mol %). The compositions further vary depending on whether they are processed by extrusion or by compression molding. In all cases the Mooney viscosity of the polymer, measured according to ASTM standard 1646, $M_L$ (1'+10') at 121° C., ranges from 25 to 50 Mooney degrees.

Composition I

When they are processed by extrusion with a copolymer, the compositions comprise:

| | |
|---|---|
| a) the copolymer | 100 parts by weight |
| b) bisphenol AF [hexafluoro-isopropylidene (bis-4-hydroxybenzene] | about 0.5–1.0 parts by weight |
| c) a quaternary phosphonium or aminophosphonium salt, as further defined | about 0.5–1.0 parts by weight |
| d) azodicarbonamide | about 2.5–5.0 parts by weight |
| e) MgO | about 1.0–2.0 parts by weight |
| f) Ca(OH)$_2$ | about 1.0–3.0 parts by weight |
| g) zinc stearate | about 1.0–3.0 parts by weight |
| h) polyoxyethyleneglycol having an average molecular weight ranging from about 3,000 to 5,000 | about 0–1.0 parts by weight |
| i) a plasticizer, as further defined | about 1.0–5.0 parts by weight |

The quaternary phosphonium salt is a triphenylbenzylphosphonium salt. The aminophosphonium salt is a 1-chloro-N,N-diethyl-1,1-diphenyl-1-(phenylmethyl) phosphoranamine.

The former of these salts is sold by duPont de Nemours, in admixture with the copolymer, under the trade-mark Viton® C 20; the latter is sold by Ausimont, in admixture with the copolymer, under the trade-mark Tecnoflon® FOR M2.

The phosphonium or aminophosphonium salt can be used in the form of its adduct with bisphenol AF as, is described for example in U.S. Pat. No. 4,496,682 and in Italian patent application 41009/A 89.

Such adducts are sold by duPont de Nemours under the trade-mark Viton® C 50 and by Ausimont under the trade-mark Tecnoflin® XA 51.

The plasticizer cited in the preceding compositions is selected from the group consisting of esters of fatty acids and of adipic acid, polyethers derived from the polycondensation of ethylene oxide and/or propylene oxide, low molecular weight polyethylenes, dioctylphthalate, dibutylphthalate, di-(2-ethylhexyl)phthalate and other phthalic acid derivatives exhibiting plasticizing properties, 5,8,11,13,16,19-hexaoxa-tricosane, and the condensation products of derivatives of fatty acids and silicones on inorganic carriers. Among the fatty acid esters are, for example, the stearic acid esters and the sebacic acid esters.

Among the adipic acid esters it is possible to use, for example, di(butoxy-ethoxy-ethyl) adipate.

The above-mentioned polyethers have, preferably, an average molecular weight ranging from 600 to 1,000 and the polyethylenes an average molecular weight ranging from 1,100 to 1,500.

The condensation products of derivatives of fatty acids and silicones are available on the market, under the trade-mark Struktol® WS 280 of Schill und Seilacher, in the form of the above-described condensation products (75%) carried on $SiO_2$ (25%).

5,8,11,13,16,19-hexaoxa-tricosane is commercially available in admixture (at 94% by weight) with diethylene glycolmonobutylether (1.5%) and formaldehyde (0.1%), and it is sold by Thiokol Corp. under the trade-mark TP-90®.

Besides the above-described components, the compositions conforming to the present invention (including the ones discussed further on herein) can contain the usual fillers utilized in the fluoroelastomeric formulations, such as, for example, carbon black, barite, kaolin, $TiO_2$ and dyeing pigments; such fillers are added in the usual proportions with respect to the copolymer.

Composition II

When they are to be processed by subjecting the copolymers to compression molding, the compositions conforming to the present invention comprise the components from a) to h) as defined above, in the above-indicated proportions, and furthermore:

| j) a plasticizer, as defined above | about 0–5.0 parts by weight |
|---|---|
| k) ZnO or | about 3.5–7.0 parts by weight. |
| dibasic lead phosphite | about 2.0–6.0 parts by weight |

In these compositions, the use of the plasticizer is not indispensable for the production of plates of little thickness. However, it is preferable to use it for plates of great thickness.

Composition III

When the terpolymers are processed by extrusion, the components from b) to i) are exactly the same as the ones of compositions I, but their proportions are slightly different:

| a) terpolymer | 100 | parts by weight |
|---|---|---|
| b) bisphenol AF | about 1.0–2.5 | parts by weight |
| c) quaternary phosphonium or aminophosphonium salt | about 1.0–3.0 | parts by weight |
| d) azodicarbonamide | about 2.5–5.0 | parts by weight |
| e) MgO | about 1.0–2.0 | parts by weight |
| f) Ca(OH)$_2$ | about 1.0–3.0 | parts by weight |
| g) zinc stearate | about 1.0–3.0 | parts by weight |
| h) polyoxyethylene glycol having an average molecular weight from about 3,000 to 5,000 | about 0–1.0 | parts by weight |
| i) plasticizer | about 1–5.0 | parts by weight |

Composition IV

When the terpolymers are processed by compression molding, the compositions conforming to the present invention comprise the components from a) to h) defined in compositions III, in the proportions defined in said compositions, and furthermore:

| j) plasticizer as defined in compositions I | about 0–5.0 parts by weight |
|---|---|
| k) ZnO or | about 2.0–7.0 parts by weight |
| dibasic lead phosphate | about 2.0–6.0 parts by weight. |

The copolymers and terpolymers are marketed by:
Ausimont, under the trademark Tecnoflon®;
Dupont de Nemours, under the trademark Viton®;
3M, under the trademark Fluorel®;
Asahi Chemicals, under the trademark Miraflon®.

The compositions according to the present invention can be prepared as follows:

a) preparation of the basic mix: in this step, reinforcing fillers, optional plasticizers and processing coadjuvants, cross-linking and swelling agents and kickers are added to the basic elastomer. The whole is homogenized in open or closed mixers according to the usual procedures, which are known to those skilled in the art;

b) the mix so obtained is then allowed to stand for at least 24 hours in accordance with the usual procedures;

c) after such period, the mix is taken up for the final homogenization in an open mixer.

Processing in an extruder is preferably conducted as follows: feeding occurs at 30°–50° C.; the temperature ranges from 60° to 80° C. in the extruder body and, at the extruder outlet, from 70° to 100° C. Vulcanization follows, which is usually carried out in an autoclave at 125°–150° C.

Processing in a press is usually conducted at 130°–160° C.

Post-curing is carried out in both cases in an oven, usually at 180°–260° C. for 20–35 hours, the raising time being 5–14 hours.

The microcellular foamed articles prepared according to the present invention exhibit excellent characteristics with regards to flexibility, resistance to abrasion, elasticity, resistance to fluids and to heat, and exhibit low densities. Also the mechanical properties are very good. In particular the compression set, especially at high temperatures, is excellent.

Such articles are useful in applications where they are subjected to particularly severe conditions, which are not tolerated by the microcellular foamed rubbers available at present on the market. Some of these applications are: industrial gaskets, electric cable coating, thermal and sound-proofing insulation at high temperatures.

The following examples are given to better illustrate the inventive principle of the present invention and are not to be considered as limitative of the scope thereof.

EXAMPLE 1

Formulation A was prepared with the following composition:

| | |
|---|---|
| Tecnoflon NM ® (copolymer produced by Ausimont, containing 80 mols % of vinylidene fluoride and 20 mols % of hexafluoropropene) | 100 parts |
| Tecnoflon FOR Ml ® produced by Ausimont, containing 50% by weight of Tecnoflon NM and 50% of bisphenol AF | 2 phr |
| Tecnoflon FOR M2 ® produced by Ausimont, containing 30% by weight of the aminophosphonium salt (chloride) described before and 70% of Tecnoflon NM | 3 phr |
| Gligogum 4000 ® (polyoxyethylene glycol having an average molecular weight of about 4,000, marketed by Enichem Synthesis | 0.3 phr |
| zinc stearate | 2 phr |
| TP 95 ® (di(butoxy-ethoxy-ethyl)adipate) produced by Thiokol Corp. | 2 phr |
| To 100 parts of composition A there were added: | |
| MgO-DE ® produced by Eigenman-Veronelli | 1 phr |
| Rhenofit CF ® (Ca(OH)$_2$) produced by Bayer | 2 phr |
| Tremin 283-600 EST ® produced by Quarzwerke (calcium silicate treated with aminosilane) | 10 phr |
| Black MT | 5 phr |
| Porofor ADC/K ® produced by Bayer (azodicarbonamide) | 3 phr |
| TP 95 ® | 2 phr |

The composition was fed to an extruder Ital TG/60 15 D suited to manufacture a rod having a diameter of 6 mm. The temperatures were as follows:

feed section: 40° C.

body: 60° C.

head: 80°–90° C.

The screw rotated at a speed of 9 r.p.m.

Subsequently, the extrudate, coated with talc, was placed into a steam autoclave. The treatment was conducted at about 140° C. and at a pressure of about 6 atmospheres for a period of 90 minutes.

Post-curing occurred in an oven at 200° C. for 24 hours, with a raising time of 5 hours, or at 235° C. for 24 hours, with a raising time of 8 hours.

Figure 1:
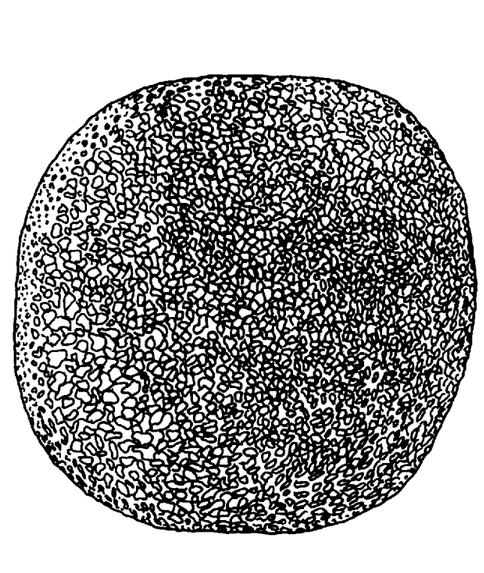
FIG. 1 shows a magnified (7.03 times) cross-sectional view of a product of the present invention.

At the end of the treatment the rods had a diameter of 10 mm; they were free from large bubbles and wrinkles and exhibited an excellent dimensional and cell-distribution homogeneity. The photograph, enlarged by 7.03 times, of a rod section at the autoclave outlet is shown in FIG. 1.

EXAMPLE 2

To 100 parts of formulation A described in example 1 there were added:

| | |
|---|---|
| MgO-DE | 1 phr |
| Rhenofit CF | 2 phr |
| Tremin 283-600 EST | 10 phr |
| Green F 2G ®, an organic pigment produced by Auschem | 2 phr |
| TiO$_2$ | 2 phr |
| TP 95 | 2 phr |
| Porofor ADC/K | 3 phr |

The extrusion and the thermal treatments described in example 1 were carried out.

At the end of the treatment, the rod exhibited appearance characteristics like those of example 1.

EXAMPLE 3

The physico-mechanical characteristics of the rods prepared in examples 1 and 2 were determined.

The density and the results of the tensile tests according to standard ASTM D 412 (the rods were fixed by means of proper clamps) are reported in Table 1.

Table 2 shows the same results after different thermal post-treatments of the rods obtained in examples 1 and 2.

Tables 3 and 4 indicate the conditions and the results of various compression set tests (according to standard ASTM D 395) on the rod of example 1 (Table 3) and on the rod of example 2 (Table 4). The compression direction is normal to the rod axis.

TABLE 1

DENSITY AND TENSILE TESTS

| FORMULATION | EXAMPLE 1 | | EXAMPLE 2 | |
|---|---|---|---|---|
| Maximum post-curing temperature (°C.) | 200 | 235 | 200 | 235 |
| Density (g/cm$^3$) | 0.60 | 0.60 | 0.67 | 0.67 |
| Hardness, Shore A (points) | 25 | 29 | 31 | 33 |
| Tensile strength (MPa) | 1.04 | 1.30 | 1.20 | 1.41 |
| Elongation at break (%) | 110 | 90 | 116 | 93 |

TABLE 2

DENSITY AND TENSILE TESTS AFTER FURTHER THERMAL TREATMENTS

| FORMULATION | EXAMPLE 1 | | | | | | EXAMPLE 2 | | | | | |
|---|---|---|---|---|---|---|---|---|---|---|---|---|
| Maximum post-curing temperature (°C.) | 200 | | | 235 | | | 200 | | | 235 | | |
| Further thermal (°C.) | 220 | 220 | 220 | 250 | 250 | 250 | 220 | 220 | 220 | 250 | 250 | 250 |
| treatment (h) | 24 | 48 | 72 | 24 | 48 | 72 | 24 | 48 | 72 | 24 | 48 | 72 |

TABLE 2-continued

DENSITY AND TENSILE TESTS AFTER FURTHER THERMAL TREATMENTS

| FORMULATION | EXAMPLE 1 | | | | | | | | EXAMPLE 2 | | | |
|---|---|---|---|---|---|---|---|---|---|---|---|---|
| Density (g/cm$^3$) | 0.61 | 0.60 | 0.60 | 0.60 | 0.62 | 0.60 | 0.68 | 0.66 | 0.67 | 0.67 | 0.67 | 0.68 |
| Hardness, Shore A (points) | 30 | 30 | 34 | 31 | 33 | 36 | 33 | 35 | 39 | 34 | 37 | 40 |
| Tensile strength (MPa) | 1.15 | 1.20 | 1.20 | 1.50 | 1.52 | 1.60 | 11.30 | 1.35 | 1.40 | 1.50 | 1.58 | 1.65 |
| Elongation at break (%) | 97 | 90 | 92 | 82 | 74 | 70 | 100 | 94 | 98 | 87 | 74 | 69 |

TABLE 3

COMPRESSION SET AS A FUNCTION OF THE OPERATIVE CONDITION
ROD OF EXAMPLE 1

| Maximum post-crosslinking temperature (°C.) | 200 | | | | | | | |
|---|---|---|---|---|---|---|---|---|
| Test Temperature (°C.) | 150 | | 170 | | 170 | | 190 | |
| Test temperature (h) | 24 | | 70 | | 24 | | 24 | |
| Compression set (%) | 25 | 50 | 25 | 50 | 25 | 50 | 25 | 50 |
| Reading after 30 minutes at test temperature (%) | 10.8 | 7.7 | 18.8 | 17.9 | 17.8 | 16.0 | 41.0 | 31.0 |
| Reading after 30 minutes at 23° C. (%) | 14.2 | 7.5 | 22.9 | 21.8 | 23.1 | 20.0 | 43.0 | 33.4 |

| Maximum post-crosslinking temperature (°C.) | 235 | | | | | | | | | | | |
|---|---|---|---|---|---|---|---|---|---|---|---|---|
| Test Temperature (°C.) | 150 | | 170 | | | 190 | | | 200 | | | |
| Test temperature (h) | 24 | | 70 | | 24 | | 24 | | 70 | | 24 | |
| Compression set (%) | 25 | 50 | 25 | 50 | 25 | 50 | 25 | 50 | 25 | 50 | 25 | 50 |
| Reading after 30 minutes at test temperature (%) | 7.1 | 6.0 | 12.0 | 8.4 | 11.0 | 8.0 | 22.5 | 19.0 | 41.0 | — | 43.0 | 23.0 |
| Reading after 30 minutes at 23° C. (%) | 8.9 | 6.0 | 16.0 | 10.2 | 12.0 | 9.0 | 22.1 | 20.0 | 45.0 | — | 33.0 | 23.0 |

TABLE 4

COMPRESSION SET AS A FUNCTION OF THE OPERATIVE CONDITION
ROD OF EXAMPLE 2

| Maximum post-crosslinking temperature (°C.) | 200 | | | | | | | |
|---|---|---|---|---|---|---|---|---|
| Test Temperature (°C.) | 150 | | 170 | | 170 | | 190 | |
| Test time (h) | 24 | | 70 | | 24 | | 24 | |
| Compression set (%) | 25 | 50 | 25 | 50 | 25 | 50 | 25 | 50 |
| Reading after 30 minutes at test temperature (%) | 11.1 | 8.0 | 18.0 | 17.5 | 18.0 | 15.0 | 42.8 | 33.0 |
| Reading after 30 minutes at 23° C. (%) | 15.4 | 7.6 | 22.0 | 21.3 | 24.0 | 20.0 | 44.1 | 34.0 |

| Post-crosslinking temperature (°C.) | 235 | | | | | | | | | | | | |
|---|---|---|---|---|---|---|---|---|---|---|---|---|---|
| Test temperature (°C.) | 150 | | 170 | | | 190 | | | 200 | | | | |
| Test time (h) | 24 | | 70 | | 24 | | 24 | | 70 | | 24 | | 70 |
| Compression set (%) | 25 | 50 | 25 | 50 | 25 | 50 | 25 | 50 | 25 | 25 | 50 | 25 | 50 |
| Reading after 30 minutes at test temperature (%) | 7.5 | 4.6 | 10.0 | 8.0 | 11.0 | 8.0 | 21.0 | 14.0 | 39.0 | 30 | 23 | 58 | 52 |
| Reading after 30 minutes at 23° C. (%) | 10.0 | 5.1 | 16.0 | 9.0 | 14.0 | 11.0 | 22.4 | 18.0 | 45.0 | 31 | 25 | 43 | 40 |

EXAMPLE 4

To the final composition of example 1 there were added 3 phr of dibasic lead phosphite (Dyphos® produced by REAGENS), whereafter the press molding of 11 cm×11 cm×8 mm plates was effected.

It was operated in the press at 135° C. for 25 minutes with a pressure of 200 bar. Post-curing in an oven was effected at 200° C. for 24 hours, with a raising time of 8 hours.

The final dimensions of the plate were 13 cm×13 cm×12 mm. The appearance of the plate had characteristics like the ones of the rod of example 1.

EXAMPLE 5

To the final composition of example 2 there were added 2.5 phr of ZnO produced by CARBOCROM, whereafter the press molding according to the modalities of example 4 was carried out.

The appearance of the final plate had characteristics like the ones of the rod of example 1.

EXAMPLE 6

A rod having the same dimensions of the rod of example 1 was prepared by extrusion starting from a composition based on terpolymer Tecnoflon TN 80® produced by Ausimont, containing: 65 moles % of vinylidene fluoride, 20% of hexafluoroptopene and 15% of tetrafluoroethylene.

The composition was as follows:

| | |
|---|---|
| Tecnoflon TN 80 | 100 parts |
| Tecnoflon FOR MI (having the same proportion of elastomer and of bisphenol AF as in the composition of example 1) | 2.5 phr |
| Tecnoflon FOR M2 (having the same proportion of elastomer and of aminophosphonium salt as in the composition of example 1) | 4.5 phr |
| Porofor ADC/K | 3 phr |
| MgO-DE | 1 phr |
| Tremin 283-600 EST | 10 phr |
| Ca(OH)$_2$ | 2 phr |
| Black MT | 5 phr |
| Zinc stearate | 2 phr |
| Glicogum 4000 | 0.3 phr |
| TP 95 | 4 phr |

It was operated as in example 1. The appearance of the resulting rod had characteristics like those of the rod of example 1.

EXAMPLE 7

A microcellular foamed plate was prepared by compression molding starting from a composition based on the terpolymer of example 6.

The composition was as follows:

| | |
|---|---|
| Tecnoflon TN 80 | 100 parts |
| Tecnoflon FOR MI | 2.5 phr |
| Tecnoflon FOR M2 | 4.5 phr |
| Porofor MDC/K | 3 phr |
| MgO-DE | 1 phr |
| Ca(OH)$_2$ | 2 phr |
| Tremin 283-600 EST | 10 phr |
| Black MT | 5 phr |
| Zinc stearate | 2 phr |
| Glicogum 4000 | 0.3 phr |
| TP 95 | 4 phr |
| Dyphos | 3 phr |

Molding was effected in accordance with the modalities of example 4.

The final plate appearance had characteristics like the one of the rod of example 1.

EXAMPLES 8–16

In Table 5 various compositions conforming to the present invention are shown, which are appropriate to obtain microcellular foamed cured articles based on vinylidene fluoride/hexafluoropropene copolymers by means of the extrusion technology.

All the rods, prepared following the procedure of example 1, had appearance characteristics like the one of example 1.

TABLE 5

COMPOSITIONS BASED ON VDF - HFP COPOLYMERS USEFUL TO PREPARE FOAMED ARTICLES BY MEANS OF THE EXTRUSION TECHNOLOGY

| EXAMPLE NO. | 8 | 9 | 10 | 11 | 12 | 13 | 14 | 15 | 16 |
|---|---|---|---|---|---|---|---|---|---|
| Tecnoflon NM | 100 | 100 | 100 | 100 | 100 | 100 | 100 | 100 | 100 |
| Tecnoflon FOR M1 | 1 | 1 | 1 | 2 | 2 | 2 | 2 | 2 | 2 |
| Tecnoflon FOR M2 | 2 | 2 | 2 | 3 | 3 | 3 | 3 | 3 | 3 |
| Porofor ADC/K | 4 | 4 | 4 | 3 | 3 | 3 | 3 | 3 | 3 |
| MgO-DE | 1 | 1 | 1 | 1 | 1 | 1 | 1 | 1 | 1 |
| Ca(OH)$_2$ | 2 | 2 | 2 | 2 | 2 | 2 | 2 | 2 | 2 |
| Tremin 283-600 EST | — | — | 10 | 10 | 10 | 10 | 10 | 10 | 10 |
| Black MT | 10 | 10 | — | 5 | 5 | 5 | 5 | 5 | 5 |
| Zn stearate | 2 | 2 | 2 | 2 | 2 | 2 | 2 | 2 | 2 |
| Bayferrox (1) | — | — | 5 | — | — | — | — | — | — |
| Polyethylene AC 617/A | 3 | 3 | 3 | — | — | — | — | — | — |
| Sumpar 2280 (2) | 0.5 | — | 0.5 | — | — | — | — | — | — |
| Glicogum 4000 | — | — | — | 0.3 | 0.3 | 0.3 | 0.3 | 0.3 | 0.3 |
| ZnO | — | — | — | 1 | 3 | 5 | — | — | — |
| TP 95 | 3 or 4 | 3 or 4 | 3 or 4 | 3 or 4 | 3 or 4 | 3 or 4 | 3 or 4 | 3 or 4 | 3 or 4 |
| Dyphos | — | — | — | — | — | — | 1 | 3 | 3 |

(1) red iron oxide
(2) di-butoxyethoxyethyl adipate produced by BP Chemicals

EXAMPLES 17–25

In Table 6 various compositions conforming to the present invention are shown, which are appropriate to prepare microcellular foamed cured articles based on vinylidene fluoride/hexafluoropropene copolymers via compression molding.

All the plates prepared according to the procedure of example 4 exhibit a final aspect having characteristics like the ones of the rod of example 1.

TABLE 6

COMPOSITIONS BASED ON VDF - HFP COPOLYMERS SUITABLE FOR PREPARING FOAMED ARTICLES BY MEANS OF THE COMPRESSION MOLDING TECHNOLOGY

| EXAMPLE NO. | 17 | 18 | 19 | 20 | 21 | 22 | 23 | 24 | 25 |
|---|---|---|---|---|---|---|---|---|---|
| Tecnoflon NM | 100 | 100 | 100 | 100 | 100 | 100 | 100 | 100 | 100 |
| Tecnoflon FOR M1 | 1 | 1 | 1 | 1 | 1 | 1 | 1 | 1 | 2 |
| Tecnoflon FOR M2 | 2 | 2 | 2 | 2 | 2 | 2 | 2 | 2 | 3 |
| Porofor ADC/K | — | — | 4 | — | — | 4 | 4 | 4 | 3 |
| Porofor ADC/R (1) | — | — | — | 4 | — | — | — | — | — |
| Celogen AZ (1) | — | — | — | — | 4 | — | — | — | — |
| Cellmic CAP 250 (1) | — | 5 | — | — | — | — | — | — | — |
| Cellmic CAP 500 (1) | 5 | — | — | — | — | — | — | — | — |
| MgO-DE | 1 | 1 | 1 | 1 | 1 | 1 | 1 | 1 | 1 |
| Ca(OH)$_2$ | 2 | 2 | 2 | 2 | 2 | 2 | 2 | 2 | 2 |
| Tremin 283-600 EST | — | — | — | — | — | — | — | 10 | 10 |
| Black MT | 10 | 10 | 10 | 10 | 10 | 10 | 10 | — | 5 |
| Zn stearate | 2 | 2 | 2 | 2 | 2 | 2 | 2 | 2 | 2 |
| Bayferrox | — | — | — | — | — | — | — | 5 | — |
| Polyethylene AC617/A | — | — | — | — | — | 3 | 3 | 3 | — |
| Sumpar 2280 | — | — | — | — | — | 0.5 | — | 0.5 | — |
| Glicogum | — | — | — | — | — | — | — | — | 0.3 |
| TP 95 | — | — | — | — | — | 3 or 4 | 3 or 4 | 3 or 4 | 3 or 4 |

The above-indicated compositions also contain 5 phr of ZnO or with 4 phr of Dyphos.
(1) Azodicarbonamide

EXAMPLES 26–27

In Table 7 two compositions conforming to the present invention are shown, which are appropriate to prepare microcellular foamed cured articles based on vinylidene fluoride/hexafluoropropene/tetrafluoroethylene terpolymers by means of the extrusion technology.

All the rods prepared according to the procedure of example 1 exhibit a final aspect having characteristics like the ones of the rod of example 1.

TABLE 7

COMPOSITIONS BASED ON VDF-HFP-TFE TERPOLYMERS SUITED TO PREPARE FOAMED ARTICLES BY MEANS OF THE EXTRUSION TECHNOLOGY

| EXAMPLE NO. | 26 | 29 |
|---|---|---|
| Tecnoflon TN 80 | 100 | 100 |
| Tecnoflon FOR M1 | 2.5 | 2.5 |
| Tecnoflon FOR M2 | 4.5 | 4.5 |
| Porofor ADC/K | 3 | 3 |
| MgO-DE | 1 | 1 |
| Ca(OH)$_2$ | 2 | 2 |
| Tremin 283-600 EST | 10 | 10 |
| Black MT | 5 | — |
| Green F2G | — | 2 |
| TiO$_2$ | — | 2 |
| Zn stearate | 2 | 2 |
| Glicogum 4000 | 0.3 | 0.3 |
| TP 95 | 4 | 4 |

EXAMPLES 28–29

In Table 8 there are reported further two compositions conforming to the present invention, which are suitable for preparing microcellular foamed cured articles based on vinylidene fluoride/hexafluoropropene/tetrafluoroethylene terpolymers by means of the compression molding technology.

All the plates prepared according to the procedure of example 4 had a final aspect exhibiting characteristics equal to the ones of the rod of example 1.

TABLE 8

COMPOSITIONS BASED ON VDF-HFP-TFE TERPOLYMERS SUITED TO PREPARE FOAMED ARTICLES BY MEANS OF THE COMPRESSION MOLDING TECHNOLOGY

| EXAMPLE NO. | 28 | 29 |
|---|---|---|
| Tecnoflon TN 80 | 100 | 100 |
| Tecnoflon FOR M1 | 2.5 | 2.5 |
| Tecnoflon FOR M2 | 4.5 | 4.5 |
| Porofor ADC/K | 3 | 3 |
| MgO-DE | 1 | 1 |
| Ca(OH)$_2$ | 2 | 2 |
| Tremin 283-600 ET | 10 | 10 |
| Black MT | 5 | — |
| Vulcol F2G | — | 2 |
| TiO$_2$ | — | 2 |
| Zn stearate | 2 | 2 |
| Glicogum 4000 | 0.3 | 0.3 |
| TP 95 | 4 | 4 |

The above compositions also contain 5 phr of ZnO or 3–5 phr of Dyphos.

EXAMPLES 30–35 (comparative)

These examples relate to a few compositions based on Tecnoflon NM copolymer and not conforming to the present invention. These compositions were press molded at 135° C. for 25 minutes following the procedure of example 4.

When leaving the press, the foamed plates were defective for one or more of the following characteristics: surface roughness, large bubbles, irregular dimension of the cells and non-homogeneous distribution of them. As a result it was not possible to effect post-curing in an oven.

The corresponding compositions are reported in Table 9.

TABLE 9

| EXAMPLE NO. | 30 | 31 | 32 | 33 | 34 | 35 |
|---|---|---|---|---|---|---|
| Tecnoflon NM | 100 | 100 | 100 | 100 | 100 | 100 |
| Tecnoflon FOR M1 | 1.5 | 1 | 1 | 2 | 1 | 1 |
| Tecnoflon FOR M2 | 1.5 | 2 | 2 | 3 | 2 | 2 |
| Porofor ADC/K | — | — | — | 3 | 4 | 4 |

TABLE 9-continued

| EXAMPLE NO. | 30 | 31 | 32 | 33 | 34 | 35 |
|---|---|---|---|---|---|---|
| Porofor TSH/75 (1) | — | 4 | — | — | — | — |
| Cellmic H (1) | 5 | — | 5 | — | — | — |
| Polyethylene AC/617A | — | — | — | — | 3 | — |
| MgO-DE | 2 | 1 | 1 | 1 | 1 | 1 |
| Ca(OH)$_2$ | 3 | 2 | 2 | 2 | 2 | 2 |
| Bayferrox | — | — | — | — | 5 | — |
| Tremin 600 EST | — | — | — | 10 | — | — |
| Celite 350 (2) | — | — | — | — | — | 5 |
| Black MT | 10 | 10 | 10 | 5 | 10 | 5 |
| Zn stearate | 2 | 2 | 2 | 2 | 2 | 2 |
| CaO | — | — | — | 3 | — | — |
| Sumpar 2280 | — | — | — | — | 0.5 | — |
| TP 95 | — | — | — | 3 | 3 | 3 |
| Epon 828 (3) | — | — | — | — | 1 | — |

(1) (hydrazide)
(2) (white filler)
(3) (plasticizer)

We claim:

1. Compositions based on elastomeric copolymers containing from 78 to 83 moles % of vinylidene fluoride and from 17 to 22 moles % of hexafluoropropene, which are subjected to extrusion, are cured at temperatures ranging from 125° to 150° C. and lastly are post-cured at temperatures ranging from 180° to 260° C. for 20–35 hours, with a raising time ranging from 5 to 14 hours, said compositions consisting essentially of

| | |
|---|---|
| a) an elastomeric copolymer as defined above having a M$_L$ viscosity (1' + 10') at 121° C. ranging from 25 to 50 Mooney degrees | 100 parts by wg. |
| b) bisphenol AF | about 0.5–1.0 parts by wg. |
| c) quaternary phosphonium or aminophosphonium salt | about 0.5–1.0 parts by wg. |
| d) azodicarbonamide | about 2.5–5.0 parts by wg. |
| e) MgO | about 1.0–2.0 parts by wg. |
| f) Ca(OH)$_2$ | about 1.0–3.0 parts by wg. |
| g) zinc stearate | about 1.0–3.0 parts by wg. |
| h) polyoxyethylene glycol having an average molecular weight from about 3,000 to 5,000 | about 0–1.0 parts by wg. |
| i) plasticizer | about 1.0–5.0 parts by wg.; | wherein the quaternary phosphonium salt is a triphenylbenzylphosphonium salt and the quaternary aminophosphonium salt is a 1-chloro-N, N-diethyl-1,1-diphenyl-1 (phenylmethyl) phosphoranamin salt, while the plasticizer is selected from the group consisting of the esters of fatty acids and of adipic acid, polyethers deriving from the polycondensation of ethylene oxide and/or propylene oxide, low molecular weight polyethylenes, dioctylphthalate, di(2-ethylhexyl) phthalate and other phtahalic acid derivatives having plasticizing properties, 5,8,11,13,16,19-hexaoxa-tricosane and the condensation products of derivatives of fatty acids and silicones on inorganic carriers.

2. Compositions based on elastomeric copolymers containing from 78 to 83 moles % of vinylidene fluoride and from 17 to 22 moles % of hexafluoropropene, which are in press moulded at temperatures ranging from 130° to 160° C. and post-cured at 180° to 260° C. for 20–35 hours, with a raising time ranging from 5 to 14 hours, said compositions consisting essentially of the components from a) to h) defined in claim 1, in the proportions defined in the same claim, and

| | |
|---|---|
| i) a plasticizer as defined in claim 1 | about 0–5.0 parts by wg. |
| k) ZnO or dibasic lead phosphite | about 3.5–7.0 parts by wg, about 2.0–6.0 parts by wg. |

3. Compositions based on elastomeric terpolymers containing from 50 to 79 moles % of vinylidene fluoride, from 17 to 25 moles % of hexafluoropropene and from 4 to 25 moles % of tetrafluoroethylene, which are extruded, cured at temperatures ranging from 125° to 150° C. and post-cured at 180° to 260° C. for 20–35 hours, with a raising time ranging from 5 to 14 hours, said compositions consisting essentially of

| | |
|---|---|
| a) a terpolymer as defined above having a M$_L$ viscosity (1' + 10') at 121° C. ranging from 25 to 50 Mooney degrees | 100 parts by wg. | wherein the quaternary phosphonium salt is a triphenylbenzylphosphonium salt and the quaternary aminophosphonium salt is a 1-chloro-N, N-diethyl-1,1-diphenyl-1 (phenylmethyl)-phosphoranamine salt, while the plasticizer is selected from the group consisting of esters of fatty acids and of adipic acid, polyethers derived from the polycondensation of ethylene oxide and/or propylene oxide, low molecular weight polyethylenes, dioctylphthalate, dibutylphthalate, di(2-ethylhexyl) phthalate and other derivatives of phthalic acid having plasticizing properties, 5,8,11,13,16,19-hexaoxa-tricosane and the condensation products of derivatives of fatty acids and silicones on inorganic carriers.

4. Compositions based on elastomeric terpolymers containing from 50 to 79 moles % of vinylidene fluoride, from 17 to 25 moles % of hexafluoroptopene and from 4 to 25 moles % of tetrafluoroethylene, which are in press moulded at temperatures ranging from 130° to 160° C. and post-cured at 180° to 260° C. for 20–35 hours, with a raising time ranging from 5 to 14 hours, said compositions consisting essentially of the components from a) to h) defined in claim 3, in the proportions defined in the same claim, and

| | |
|---|---|
| i) a plasticizer as defined in claim 3 | about 0–5.0 parts by wg. |
| k) ZnO or dibasic lead phosphite | about 2.0–7.0 parts by wg. about 2.0–6.0 parts by wg. |

5. The microcellular foamed cured article based on the elastomeric copolymer of claim 1.

6. The microcellular foamed cured article based on the elastomeric copolymer of claim 2.

7. The microcellular foamed cured article based on the elastomeric terpolymer of claim 3.

8. The microcellular foamed cured article based on the elastomeric terpolymer of claim 4.

* * * * *

UNITED STATES PATENT AND TRADEMARK OFFICE
CERTIFICATE OF CORRECTION

PATENT NO : 5,883,197

DATED : March 16, 1999

INVENTOR(S): Franco BARBIERI, et al.

Page 1 of 2

It is certified that error appears in the above-identified patent and that said Letters Patent is hereby corrected as shown below:

In claim 3, line 21, after "degrees", please insert:

--b) bisphenol AF about 1.0-2.5 parts by wg.

c) quaternary phosphonium or aminophosphonium salt about 1.0-3.0 parts by wg.

d) azodicarbonamide about 2.5-5.0 parts by wg.

e) MgO about 1.0-2.0 parts by wg.

f) Ca(OH)$_2$ about 1.0-3.0 parts by wg.

g) zinc stearate about 1.0-3.0 parts by wg.

h) polyoxyethylene glycol having an average molecular weight from about 3,000 to 5,000 about 0-1.0 parts by wg.

i) plasticizer about 1.0-5.0 parts by wg.--

UNITED STATES PATENT AND TRADEMARK OFFICE
CERTIFICATE OF CORRECTION

PATENT NO : 5,883,197
DATED : March 16, 1999
INVENTOR(S): Franco BARBIERI, et al.

It is certified that error appears in the above-identified patent and that said Letters Patent is hereby corrected as shown below:

In claim 4, line 39, delete "hexafluoroptopene" and insert --hexafluoropropene-- in place thereof.

Signed and Sealed this

Twenty-third Day of November, 1999

Attest:

Attesting Officer

Q. TODD DICKINSON

Acting Commissioner of Patents and Trademarks